United States Patent
Yamashita

(10) Patent No.: US 7,861,127 B2
(45) Date of Patent: Dec. 28, 2010

(54) DEVICE REMOTE MONITOR/RECOVERY SYSTEM

(75) Inventor: Akiyoshi Yamashita, Toon (JP)

(73) Assignee: Panasonic Corporation, Osaka (JP)

( * ) Notice: Subject to any disclaimer, the term of this patent is extended or adjusted under 35 U.S.C. 154(b) by 471 days.

(21) Appl. No.: 11/914,965

(22) PCT Filed: May 24, 2006

(86) PCT No.: PCT/JP2006/310366

§ 371 (c)(1),
(2), (4) Date: Nov. 20, 2007

(87) PCT Pub. No.: WO2006/126594

PCT Pub. Date: Nov. 30, 2006

(65) Prior Publication Data

US 2009/0083588 A1    Mar. 26, 2009

(30) Foreign Application Priority Data

May 25, 2005    (JP)    .............................. 2005-151703

(51) Int. Cl.
G06F 11/00    (2006.01)
(52) U.S. Cl. .............................. 714/57; 714/39; 714/43
(58) Field of Classification Search .................. 714/26, 714/39, 40, 43, 57
See application file for complete search history.

(56) References Cited

U.S. PATENT DOCUMENTS

| | | | | |
|---|---|---|---|---|
| 5,828,863 A | * | 10/1998 | Barrett et al. .................. | 703/24 |
| 5,918,051 A | * | 6/1999 | Savitzky et al. ............. | 719/315 |
| 6,145,098 A | * | 11/2000 | Nouri et al. .................... | 714/31 |
| 6,175,914 B1 | * | 1/2001 | Mann ......................... | 712/227 |
| 6,185,732 B1 | * | 2/2001 | Mann et al. .................. | 717/128 |
| 6,356,960 B1 | * | 3/2002 | Jones et al. ..................... | 710/5 |
| 6,502,209 B1 | * | 12/2002 | Bengtsson et al. ............ | 714/35 |
| 6,507,920 B1 | * | 1/2003 | Truebenbach ................. | 714/43 |
| 6,601,184 B1 | * | 7/2003 | Clark et al. ..................... | 714/4 |
| 6,715,087 B1 | * | 3/2004 | Vergnaud et al. ............ | 713/300 |
| 6,745,343 B1 | * | 6/2004 | Barenys et al. ................ | 714/36 |
| 7,100,083 B2 | * | 8/2006 | Little et al. .................... | 714/26 |
| 7,100,084 B2 | * | 8/2006 | Unkle et al. ................... | 714/26 |

(Continued)

FOREIGN PATENT DOCUMENTS

JP    01-300742    12/1989

(Continued)

OTHER PUBLICATIONS

"Nagare ni Sotte Miru dakede Sukkiri Wakaru Cho Etoki Shiki SNMP," Network Magazine, Apr. 1, 2005, pp. 128-135.

(Continued)

*Primary Examiner*—Joshua A Lohn
(74) *Attorney, Agent, or Firm*—Steptoe & Johnson LLP

(57) ABSTRACT

A system includes a support side host (PCh1) connected to a network (n1) and a monitored side system (u1) connected to the network (n1). The monitored side system (u1) is formed by monitored/support object devices (ud1, ud2) and an interface device (us4) connected between the devices and the network (n1) for transmitting and receiving data between the devices and the monitor host (PCh1) via the network (n1). The interface device (us4) has a debug log processing unit (us2) for directly communicating with the devices by serial interface connection with the devices (ud1, ud2) without using a device interface unit (us1) controlling the connection with the devices.

3 Claims, 6 Drawing Sheets

U.S. PATENT DOCUMENTS

| | | | |
|---|---|---|---|
| 7,296,187 B1 * | 11/2007 | Fritz et al. | 714/31 |
| 7,320,092 B2 * | 1/2008 | Morgan et al. | 714/43 |
| 7,325,170 B2 * | 1/2008 | Srinivasan et al. | 714/46 |
| 2002/0156927 A1 * | 10/2002 | Boucher et al. | 709/250 |
| 2002/0178320 A1 * | 11/2002 | Wu | 710/306 |
| 2004/0073658 A1 * | 4/2004 | Oran et al. | 709/224 |
| 2005/0114180 A1 * | 5/2005 | Ploetz et al. | 705/2 |
| 2005/0183130 A1 * | 8/2005 | Sadja et al. | 725/107 |
| 2006/0143432 A1 * | 6/2006 | Rothman et al. | 713/2 |
| 2006/0179363 A1 * | 8/2006 | LaBanca et al. | 714/57 |
| 2007/0061628 A1 * | 3/2007 | Bradbury et al. | 714/39 |

FOREIGN PATENT DOCUMENTS

| | | |
|---|---|---|
| JP | 2000-010885 | 1/2000 |
| JP | 2000-244533 | 9/2000 |
| JP | 2001-216166 | 8/2001 |
| JP | 2001-331393 | 11/2001 |
| JP | 2002-55801 | 2/2002 |
| JP | 2002-94531 | 3/2002 |

OTHER PUBLICATIONS

Kanazawa, T., "Mieru Wakaru IPv6," Network Magazine, Jan. 1, 2003, pp. 124-127.

* cited by examiner

US 7,861,127 B2

DEVICE REMOTE MONITOR/RECOVERY SYSTEM

TECHNICAL FIELD

The present invention relates to a remote monitor/recovery system for a device, and in particular, to data communications between a support host PC and various devices in a monitored side system.

BACKGROUND ART

Various recent devices (storage devices; hereinafter referred to as devices) connected to a PC to form a network contain CPUs and have software (hereinafter referred to as "firmware") installed therein to control a system composed of the devices. For example, as described in Japanese Patent Laid-Open No. 2002-94531, the devices acquire own device IDs for the network and further acquire the IDs of the other devices connected to the network to form a device information list for management on the network.

With the recent complicated devices, defects have been found in firmware in the devices shipped as products and problems have resulted from connections to PCs conforming to new standards. This in turn has complicated operational environments surrounding the devices.

However, when an end user has already been using the device, every time the device malfunctions and requires analysis and recovery from the problem, an engineer needs to visit the site in which the system environment is located to check the end user's system or the end user's whole system environment needs to be sent to the analysis support engineer. Furthermore, when a problem occurs, the problem may not immediately be solved at the site and appropriate measures may be taken at a later date. Moreover, the problem having occurred in the end user's environment may disappear after the system has been sent to the support engineer or before the support engineer visits the site.

Thus, an object of the present invention is to provide a remote monitor/recovery system for a device which can analyze and recover from a problem occurring in the end user's device via a network such as the Internet even when the support side environment is located away from the end user's environment.

DISCLOSURE OF THE INVENTION

To accomplish the object, the invention according to claim 1 provides a remote monitor/recovery system comprising a support side monitor host computer connected to a communication network and a monitored side system connected to the communication network, the remote monitor/recovery system operating via the communication network, wherein the monitored side system comprises a device to be monitored and supported and an interface apparatus connected between the device and the communication network to transmit and receive data between the device and the monitor host computer via the communication network, and the interface apparatus comprises a device interface unit that controls a connection to the device, a network connection unit that controls a connection to the communication network, and a debug log processing unit connected to the device interface unit and the network connection unit to control and monitor the device via the device interface unit in response to a command sent by the monitor host computer via the network connection unit, and wherein a serial interface connection is established between the debug log processing unit of the interface apparatus and the device in order to enable the debug log processing unit and the device to communicate directly with each other without using the device interface unit.

With this configuration, even if the device cannot communicate with the device interface unit of the interface apparatus, the support side monitor host computer enables the device to be checked for an error status and to recover from the error, via the debug log processing unit. Thus, even if the support side environment is located away from the end user's environment, the device can be checked for the error status and automatically recover from the error via a communication network such as the Internet. Thus, it is unnecessary that every time an error occurs, the engineer visits the site in which the system environment is located to check the end user's system or the end user sends the end user's whole system environment in which the problem is occurring, to the analysis support engineer. It is also possible to avoid the situation in which the problem cannot immediately be solved at the site if the problem occurs and in which appropriate measures are taken at a later date. Moreover, the device can be checked for the error with the environment maintained which existed when the problem occurred in the end user side. This prevents the problem having occurred in the end user's environment from disappearing after the system has been sent to the support engineer or before the support engineer visits the site.

The invention according to claim 2 corresponds to the invention according to claim 1 wherein the monitor host computer comprises support-dedicated software for the monitored side system and a database that stores error data patterns for the device and device recovery command sequences corresponding to the error data patterns, and on the basis of the support-dedicated software, the monitor host computer executes a first step of issuing a command reporting on a status history of the device interface unit of the interface apparatus or a command reporting on a status history of the device, to the debug log processing unit of the monitored side system via the communication network to acquire an error data pattern in the status history of the device or device interface unit from the debug log processing unit, a second step of checking an error data pattern in the status history of the device or device interface unit acquired in the first step against the error data patterns on the database, and a third step of issuing the recovery command sequence on the database corresponding to the error data pattern checked in the second step, to the debug log processing unit of the monitored side system via the communication network, the debug log processing unit then executing the recovery command to directly recover from an error in the device having the serial interface connection with the debug log processing unit of the interface apparatus.

This configuration acquires the error data pattern in the status history of the device stored in the device or device interface unit, checks the acquired error data pattern against the error data patterns on the database, issues the recovery command sequence on the database corresponding to the checked error data pattern, to the monitored side system via the communication system, to recover a sequence for the device. Thus, even if a problem occurs in the device or device interface unit, once the support side receives a direct call from the end user or detects that a problem has occurred in the end user's device on the basis of a warning from the monitored side system or the like, the debug log processing unit can directly recover the device having the serial interface connection.

The invention according to claim 3 corresponds to the invention according to claim 2 wherein before executing the first to third steps, the monitor host computer executes a fourth step of issuing a command checking whether or not the device is connected to the interface apparatus, to the debug log processing unit of the monitored side system via the communication network to check whether or not the device is connected to the interface apparatus on the basis of a response from the debug log processing unit, and a fifth step of, upon confirming in the fourth step that the device is not connected to the interface apparatus, determining that a power supply to the device is off and issuing a command activating the power supply to the device to the debug log processing unit of the monitored side system via the communication network to turn on the power supply to the device.

With this configuration, when the device is not connected to the interface apparatus, the monitor host computer determines that the power supply to the device is off, turns on the power supply to the device, and acquires the error data pattern in the status history of the device or device interface unit.

The invention according to claim 4 corresponds to the invention according to claim 3 wherein the monitor host computer executes a sixth step of, upon confirming in the fourth step that the device is connected to the interface apparatus, issuing a command checking whether or not the device interface unit is in operation, to the debug log processing unit of the monitored side system via the communication network and checking the device interface unit for an operational status thereof on the basis of a response from the debug log processing unit, and a seventh step of, upon failing to confirm that the device interface unit is in operation in the sixth step, checking whether or not a network function of the device interface unit is abnormal on the basis of a response on the operational status from the debug log processing unit, and wherein upon confirming in the seventh step that the network function of the device interface unit is abnormal, the monitor host computer issues the command reporting on the status history of the device interface unit in the first step.

With this configuration, upon failing to confirm that the device interface unit of the interface apparatus is in operation, the above-described configuration checks whether or not the abnormality is due to the network function provided between the interface apparatus and the device, and when the abnormality is due to the network function, acquires the error data pattern in the status history of the device interface unit, checks the error data pattern in the status history of the acquired device interface unit against the error data patterns on the database, and issues the recovery command sequence corresponding to the checked error data pattern to the debug log processing unit, the debug log processing unit transmitting the recovery command sequence directly to the device without using the device interface unit to recover the sequence for the device.

In the inventions according to claims 5 and 6, the device is connected to the interface apparatus in accordance with an ATAPI data transmission scheme, an SCSI data transmission scheme, or an IDE data transmission scheme, and the device interface unit of the interface apparatus has a function for transmitting and receiving data to and from the device in accordance with the data transmission scheme for the device.

With this configuration, the device interface unit of the interface apparatus transmits and receives data to and from the device in accordance with the ATAPI data transmission scheme, SCSI data transmission scheme, or IDE data transmission scheme.

In the inventions according to claims 7 and 8, the network connection unit of the interface apparatus has an IP security function, and the data transmission between the network connection unit and the monitor host computer is executed in accordance with TCP/IP, and when transmitted, a header of a data block in a packet in accordance with TCP/IP contains the command.

With this configuration, the command is contained in the header of the data block in the packet in accordance with TCP/IP to allow the device to be monitored and recovered.

With the device monitor/recovery system in accordance with the present invention, even if the device cannot communicate with the device interface unit of the interface apparatus, the support side monitor host computer can check the device for the error status and allow the device to recover from the error, via the debug log processing unit. Thus, even when the support side environment is located away from the end user's environment, the device can be checked for the error status and recover from the error via the communication network without the need to have a support engineer visit the site.

BEST MODE FOR CARRYING OUT THE INVENTION

Embodiments of the present invention will be described below with reference to the drawings.

Figure 1:
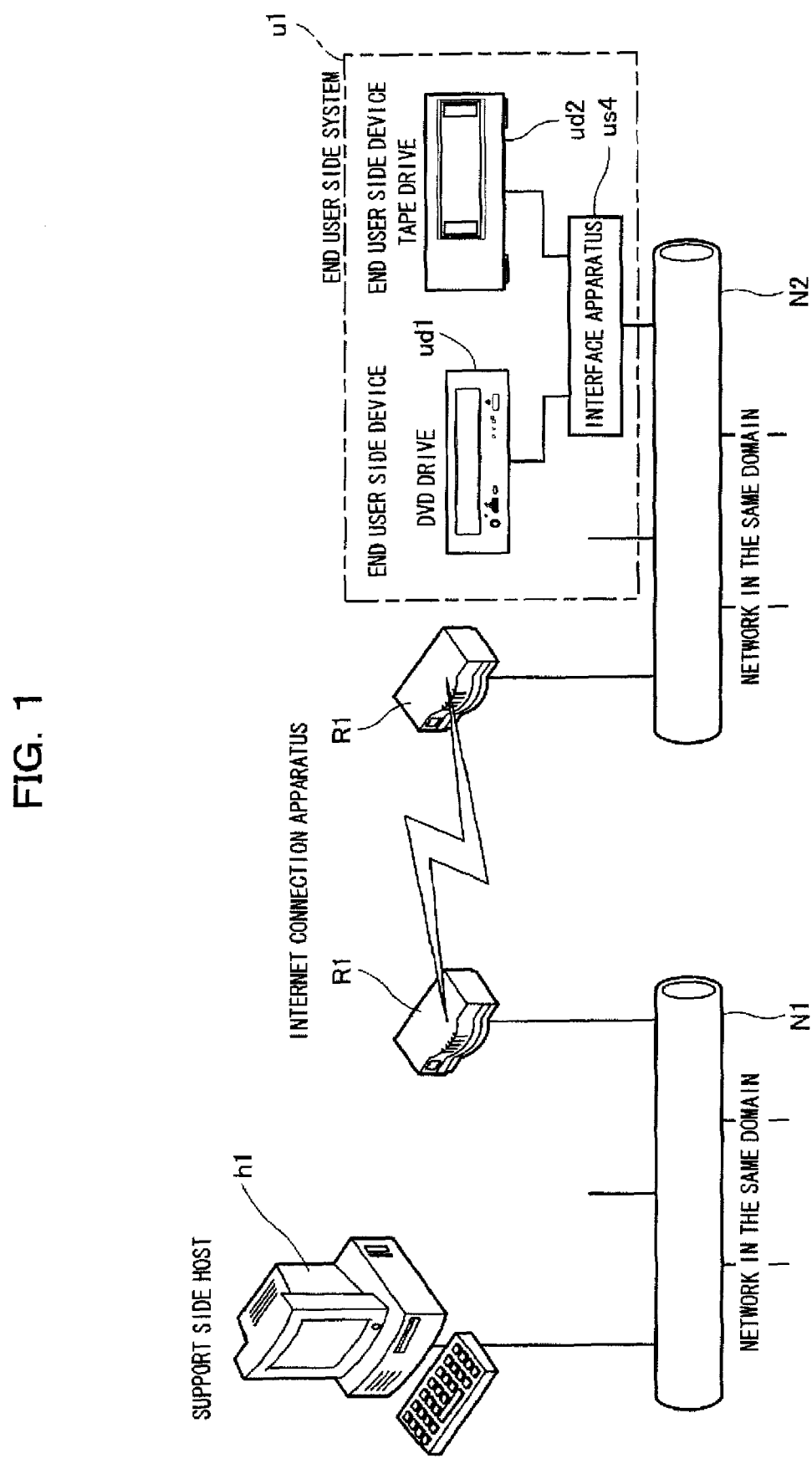
FIG. 1 is a diagram of a configuration of a device remote monitor/recovery system in accordance with an embodiment of the present invention.

FIG. 1 is a diagram of a system configuration in which a device remote monitor/recovery system in accordance with the embodiment of the present invention is implemented. A support side host PCh1 that is a monitor host computer is connected to an end user side system (monitored side system) u1 that is a target, via a network N1 for a domain in which the support side host PCh1 is located, an internet connector R1, and a network N2 for a domain in which an end user side device is located.

Figure 2:
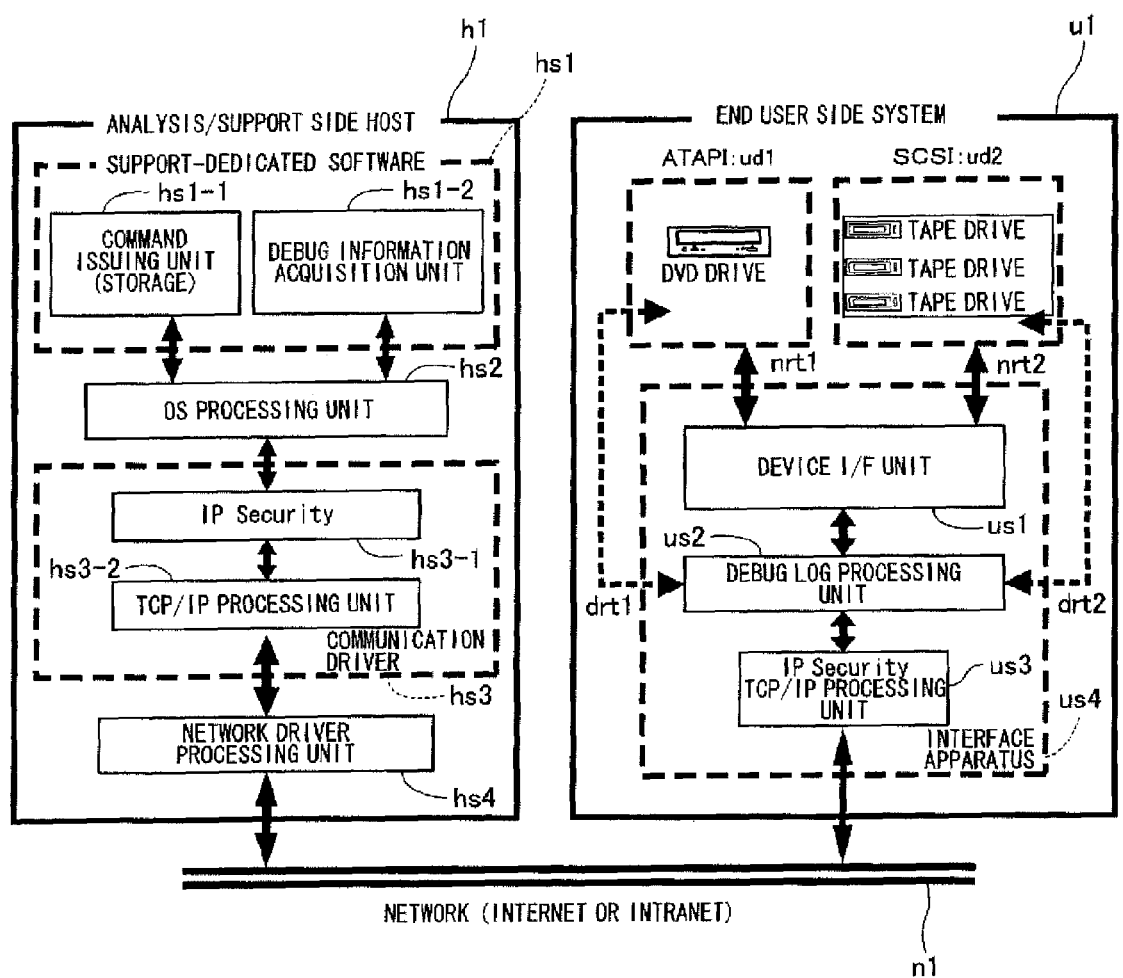
FIG. 2 is a diagram showing the entire device remote monitor/recovery system made of a support side host PC, an end user side system, and a network system.

As shown in FIG. 2, the support side host PCh1 is composed of support-dedicated software hs1, an OS (windows (registered trade mark) processing unit hs2, a communication support-dedicated software unit (communication driver) hs3, and a network driver processing unit hs4.

The support-dedicated software hs1 comprises a command issuing unit hs1-1 which prestores commands issued to the device and which issues the commands, and a debug information acquisition unit hs1-2 which stores error data patterns for the device constituting the end user side system u1 and device recovery command sequences corresponding to the error data patterns and which acquires debug information on the device.

The communication support-dedicated software unit (communication driver) hs3 is composed of an IP security processing unit hs3-1, and a TCP/IP processing unit hs3-2.

Further, the end user side system u1 is composed of a device (storage) ud1 and a device (storage) ud2 each of which is an end user side device to be monitored and supported, and an interface apparatus (I/F circuit board/conversion board; interface unit) us4 connected between both the devices ud1 and ud2 and a network system (Internet, intranet) n1 (N1, R1, N2) to transmit data between both the devices ud1 and ud2 and the support side host PCh1 via the network system n1. As shown in FIG. 2, the device ud1 is an optical device such as a DVD/CD which has an ATAPI (AT Attachment Packet Interface) interface. The device ud2 is a tape device having a SCSI (Small Computer System Interface) interface.

The interface apparatus us4 comprises a device interface unit (device I/F unit; firmware) us1, a debug log processing unit (firmware) us2, and a network connection unit (firmware) us3.

The device interface unit us1 is connected to the optical device ud1 and the tape device ud2 through the ATAPI and SCSI, respectively, to control the optical device ud1 and the tape device ud2.

The network connection unit us3 is made of an IP security processing unit and a TCP/IP processing unit to control the connection to the network system n1.

The debug log processing unit us2 is connected to the device interface unit us1 and the network connection unit us3 to control and monitor the devices ud1 and ud2 via the device interface unit us1 in response to a command sent by the support side host PCh1 via the network connection unit us3.

Serial interface connections are established among the debug log processing unit us2 of the interface apparatus us4 and the optical device ud1, and among the debug log processing unit us2 and the tape device ud2. This enables the debug log processing unit us2 and the optical device ud1, and the debug log processing unit us2 and the tape device ud2 to communicate directly with one another.

FIG. 2 shows an ATAPI path nrt1 that is a regular communication route between the device interface unit us1 and the optical device ud1 and a SCSI path nrt2 that is a regular communication route between the device interface unit us1 and the tape device ud2 as well as a special communication path drt1 that is a special communication route between the debug log processing unit us2 and the optical device ud1 and a special communication path drt2 that is a special communication route between the debug log processing unit us2 and the tape device ud2.

In this configuration, basically, the support side host PCh1 sends a monitor command for the optical device ud1 and tape device ud2 in the end user side system u1 via the network n1 (N1→R1→N2). In response to the monitor command sent via the network, the interface apparatus us4 checks the optical device ud1 and the tape device ud2 for the statuses thereof and returns the results of the check to the support side host PCh1 via the network n1 (N2→R1→N1). The support side host PCh1 confirms the returned data, and if any error is found in one or both of the devices, sends a correction-dedicated command to check the devices for the statuses thereof.

Figure 3:
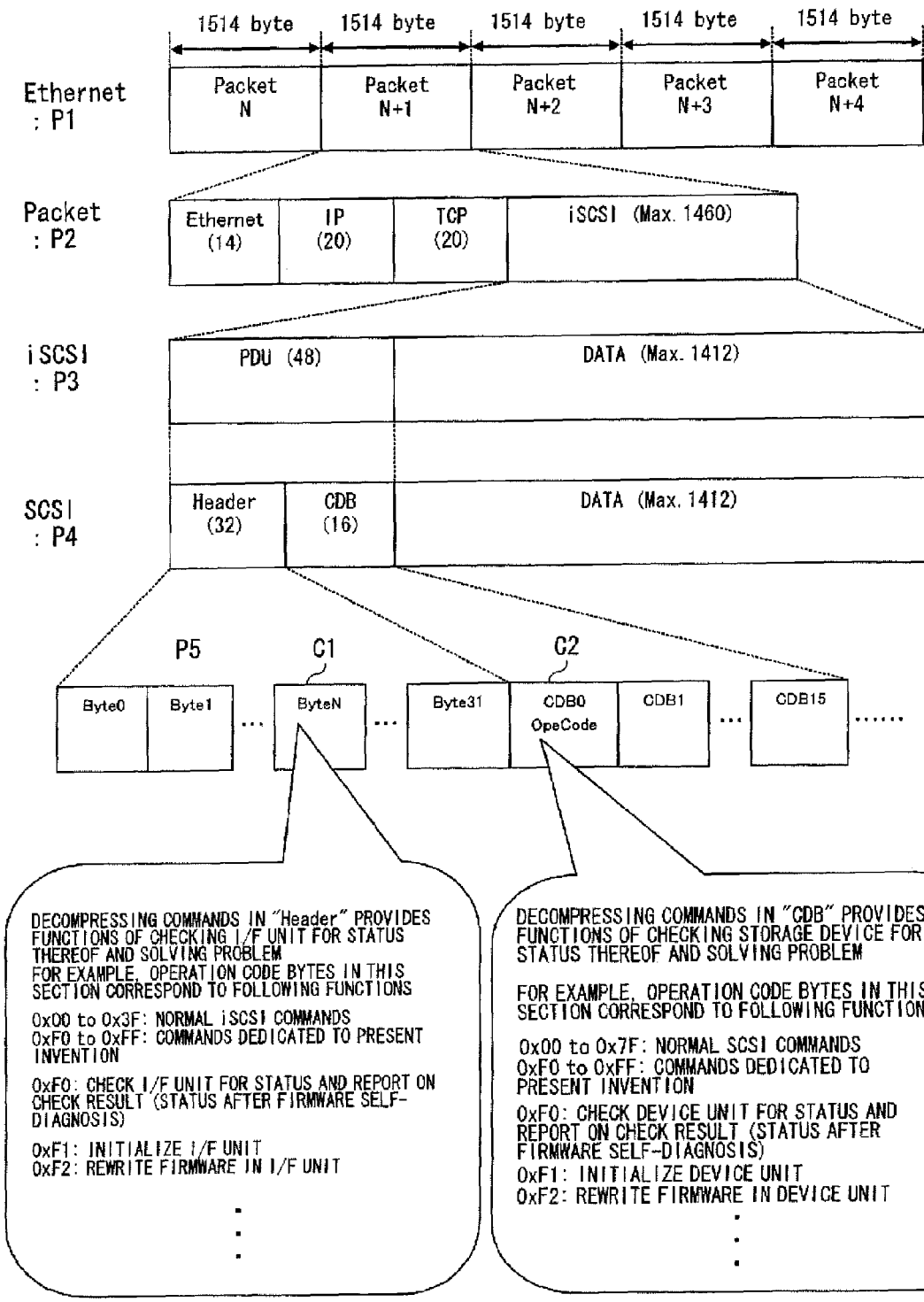
FIG. 3 is a diagram showing command packets transmitted between the support side host PC and the end user side device via a network in the device remote monitor/recovery system.

FIG. 3 shows command packets transmitted between the support side host PCh1 and the end user side system u1 via the network.

In FIG. 3, P1 denotes packets transmitted between the support side host PC and the end user side system u1 (the configuration of packets passing through the network). P2 denotes one packet extracted from the packets P1. P3 denotes a data section extracted from the P2 and communicated between the support-dedicated software hs1 and the debug firmware incorporated in the interface apparatus us4. Data block P4 denotes an actual command code or a data section obtained by removing communication header data from the P3. P5 denotes a header section extracted from the P4 and containing command data bytes.

FIG. 3 shows data packets transmitted through a communication path made of the network, debug log processing unit us2, and the storage devices ud1 and ud2. Some of the commands sent to the device are contained in the header (32 bytes) section C1 of the data block P4 in FIG. 3. The other commands sent to the device are contained in CDB (16 bytes) C2 of the data block P4 in FIG. 3.

The commands in the C1 are classified into the following operations according to code bytes.

"0x00 to 0x3F": commands for iSCSI interfaces as general standards.

"0xF0 to 0xFF": commands dedicated to the present invention and contained in the header (32 bytes) in the data block P4 in FIG. 3. These commands relate to the interface apparatus us4 in FIG. 2 and perform the following operations according to the following operation codes:

"0xF0": command checking the interface apparatus us4 for the status thereof (using a self-diagnosis function) and reporting on the status.

"0xF1": command initializing the interface apparatus us4.

"0xF2": command executing an updating process on firmware for the interface apparatus us4.

"0xF3": command starting a process of acquiring log data from the interface apparatus us4.

"0xF4": command stopping the process of acquiring log data from the interface apparatus us4.

"0xF5": command transmitting the log data from the interface apparatus us4 to the support side host PCh1.

"0xF6 to 0xFF": reserved.

The commands in the C2 are classified into the following operations according to code bytes.

"0xF0 to 0xFF": commands dedicated to the present invention and contained in the CDB (16 bytes) in the data block P4 in FIG. 3. These commands relate to the storage devices ud1 and ud2 in FIG. 2 and perform the following operations according to the following operation codes:

"0xF0": command checking the devices ud1 and ud2 for the status thereof (using a self-diagnosis function) and reporting on the status.

"0xF1": command initializing the devices ud1 and ud2.

"0xF2": command executing an updating process on firmware for the devices ud1 and ud2.

"0xF3": command starting a process of acquiring log data from the devices ud1 and ud2.

"0xF4": command stopping the process of acquiring log data from the devices ud1 and ud2.

"0xF5": command transmitting the log data from the devices ud1 and ud2 to the support side host PCh1.

"0xF6 to 0xFF": reserved.

These commands are used to implement the present invention.

Figure 4:
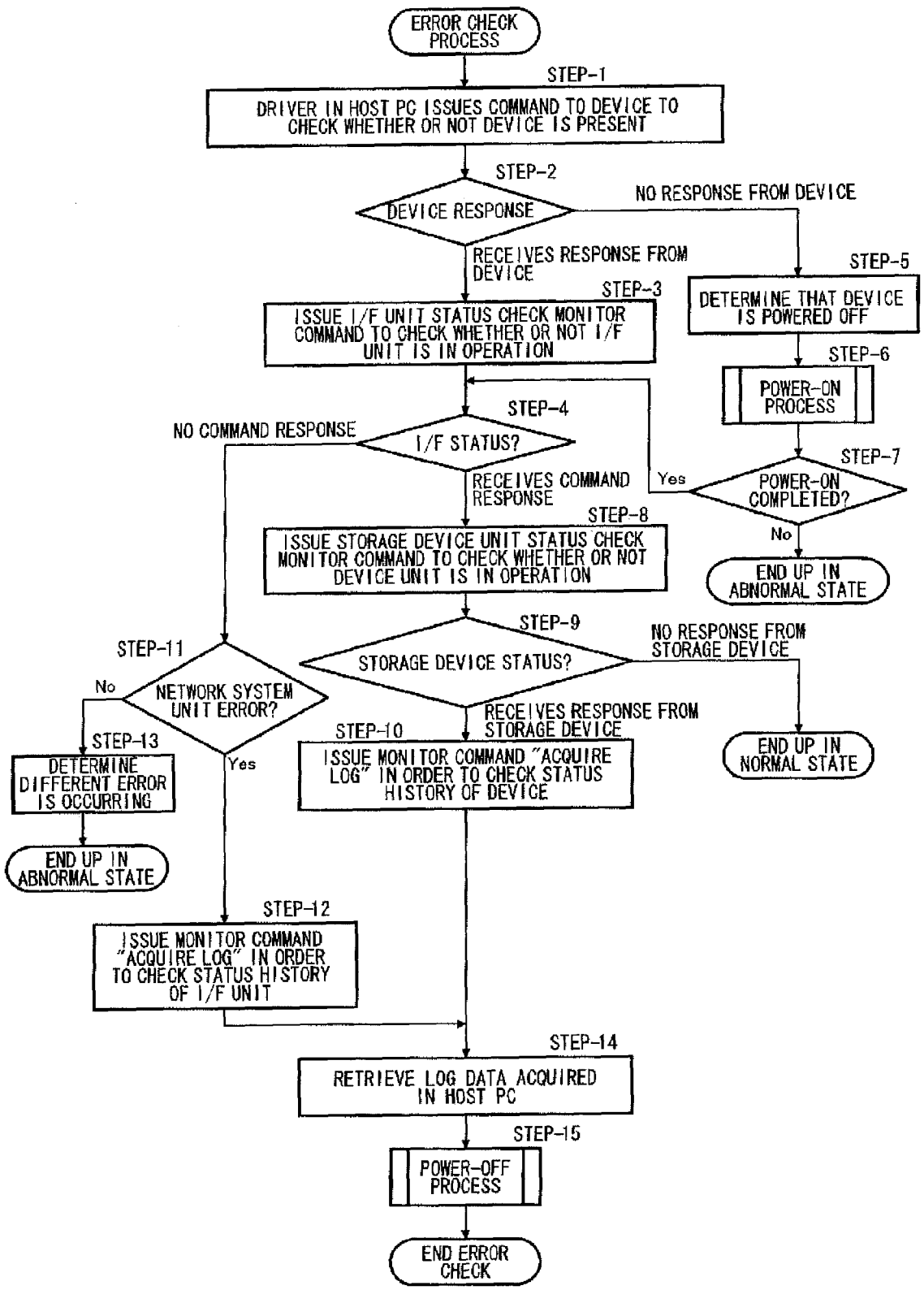
FIG. 4 is a flowchart showing a procedure in which the support side host PC in the device remote monitor/recovery system connects to a monitored side system to check the device for the status thereof.

First, with reference to a flowchart in FIG. 4, description will be given of a procedure in which the support side host PCh1 connects to the end user side system u1 to check the system for the status thereof, that is, to check the devices for errors.

First, the communication driver hs3 in the support side host PCh1 sends a "device connection check" command to the debug log processing unit us2 of the end user side system u1 through a path from hs4 through n1 to us3 (step-1). Then, the debug log processing unit us2 checks responses (presences) from the devices ud1 and ud2 via the device interface unit us1. The debug log processing unit us2 responds through the same path in the opposite direction.

The communication driver hs3 in the support side host PCh1 checks the responses (presences) (checks whether or not the devices are connected to the support side host PCh1 via the network) (step-2).

Upon checking the responses from the devices ud1 and ud2, the support-dedicated software hs1 (command issuing unit hs1-1) sends a "device interface unit (I/F unit) status check" command created by the command issuing unit hs1-1 to the debug log processing unit us2 of the end user side system u1 through a path from hs2 through hs3, hs4, and n1 to us3 (step-3). Then, in response to the "I/F unit status check" command, the debug log processing unit us2 checks whether or not the device interface unit us1 is in operation, and if the device interface unit us1 is not in operation, whether or not a network system function trouble is occurring in the device interface unit us1. The debug log processing unit us2 responds through the same path in the opposite direction.

The support-dedicated software hs1 (command issuing unit hs1-1) checks whether or not the device interface unit us1 of the interface apparatus us4 is in operation (step-4).

In the step-2, when neither the optical device ud1 nor the tape device ud2 responds, the support-dedicated software hs1 (command issuing unit hs1-1) determines that the power supply to the devices ud1 and ud2 is off (step-5). The support-dedicated software hs1 executes a power-on process described below (step-6). The support-dedicated software hs1 checks whether or not the power supply has been turned on as a result of the power-on process (step-7). When the support-dedicated software hs1 determines that the power supply has been turned on, the procedure returns to step-4. When the power supply has not been turned on, the procedure ends up in an abnormal status.

In the step-4, upon checking whether or not the device interface unit us1 is in operation, the support-dedicated software hs1 (command issuing unit hs1-1) sends a "device status check" command created by the command issuing unit hs1-1 to the debug log processing unit us2 of the end user side system u1 through the path from hs2 through hs3, hs4, and n1 to us3 (step-8). Then, in response to the "device status check" command, the debug log processing unit us2 checks the optical device ud1 and the tape device ud2 for an operational status thereof (whether or not any error is occurring in the devices ud1 and ud2) via the device interface unit us1. The debug log processing unit us2 responds through the same path in the opposite direction.

The support-dedicated software hs1 (command issuing unit hs1-1) checks the optical device ud1 and the tape device ud2 for the operational status thereof (step-9). When the support-dedicated software hs1 cannot determine the operational status, the procedure ends up in a normal status.

In the step-9, when the optical device ud1 and the tape device ud2 are in operation (an error is occurring), the support-dedicated software hs1 (command issuing unit hs1-1) sends, in order to check the status history of the optical device ud1 and the tape device ud2, a "device log data acquisition command" created by the command issuing unit hs1-1 to the debug log processing unit us2 of the end user side system u1 through the path from hs2 through hs3, hs4, and n1 to us3 to acquire device log data (step-10). At this time, in response to the "device log data acquisition" command, the debug log processing unit us2 acquires the device log data on the optical device ud1 and the tape device ud2 via the device interface unit us1. The debug log processing unit us2 responds through the same path in the opposite direction.

In the step-4, when the support-dedicated software hs1 (command issuing unit hs1-1) cannot determine that the device interface unit us1 is in operation, the support-dedicated software hs1 checks whether or not a network system function trouble is occurring in the device interface unit us1 (step-11). Upon determining that a network system function trouble is occurring, the support-dedicated software hs1 (command issuing unit hs1-1) sends, in order to check the status history of the device interface unit us1, a "device interface unit (I/F unit) log data acquisition command" created by the command issuing unit hs1-1 to the debug log processing unit us2 of the end user side system u1 through the path from hs2 through hs3, hs4, and n1 to us3 to acquire device log data from the device interface unit us1 (step-12). At this time, in response to the "I/F unit log data acquisition command", the debug log processing unit us2 acquires the device log data (log data on the optical device ud1 and the tape device ud2 stored in the device interface unit us1) from the device interface unit us1. The debug log processing unit us2 responds through the same path in the opposite direction.

In the step-11, when no network system function trouble is occurring, the support-dedicated software hs1 determines that a different error is occurring (step-13). The procedure ends up in the abnormal status.

The support-dedicated software hs1 (debug information acquisition unit hs1-2) retrieves the device log data acquired in the step-10 or the device log data acquired in the step-12 as error data patterns in the status histories of the optical device ud1 and the tape device ud2, and stores the error data patterns in the command issuing unit hs1-1 (step-14).

Subsequently, the support-dedicated software hs1 (command issuing unit hs1-1) executes a power-off process described below (step-15). The procedure ends up in an error confirmation.

This procedure is used to check the end user side devices for the statuses thereof as described above.

(1) The "device status check" command, created by the command issuing unit hs1-1 of the support-dedicated software hs1, is sent to the end user side system u1 through the path from hs2 through hs3, hs4, and n1 to us3.

(2) Upon receiving the sent "device status check" command, the device interface unit us1 and the debug log processing unit us2, the firmware on the interface apparatus us4 on the end user side system u1, checks the optical device ud1 and tape device ud2 for the statuses thereof or the interface apparatus us4 for the status thereof and creates data on the result. This log information is returned to the support-dedicated software hs1 (command issuing unit hs1-1) in the support side host PCh1 through the path from us3 through n1, hs4, and hs3 to hs1-2 for storage.

Figure 5:
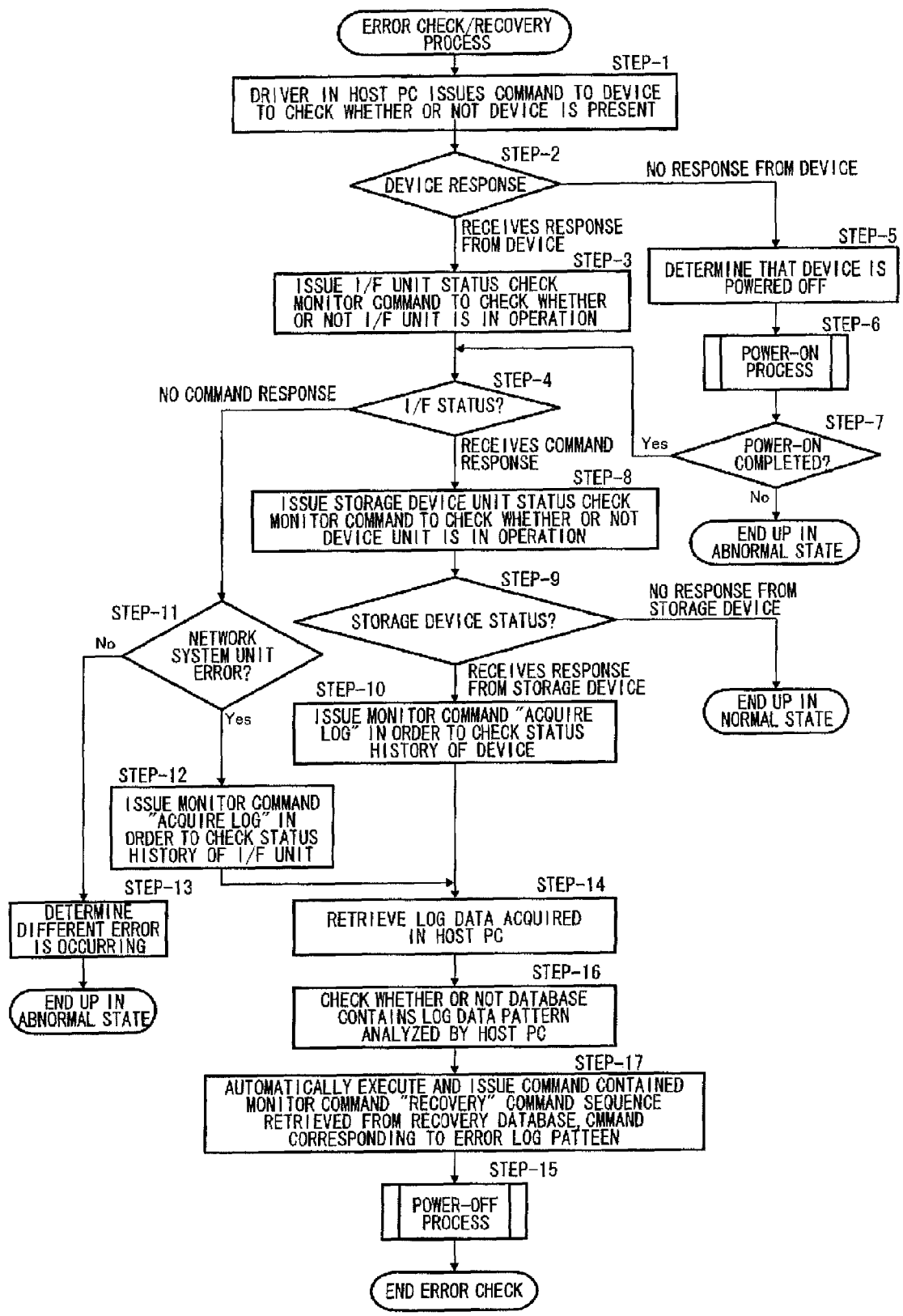
FIG. 5 is a flowchart showing a procedure in which the support side host PC in the device remote monitor/recovery system connects to the monitored side system to check the device for the status thereof to correct an error after the check.

Now, with reference to a flowchart in FIG. 5, description will be given of a procedure in which the support side host PCh1 connects to the end user side system u1 to check the system for the status thereof and after the check, corrects a possible error.

The procedure described below is added to between step-14 and step-15 of the procedure shown in FIG. 4, in which the support side host PCh1 connects to the end user side system u1 to check the system u1 for the status thereof.

After step-14, the support-dedicated software hs1 (debug information acquiring unit hs1-2) checks each of the retrieved error data patterns against the corresponding device error data pattern prestored in the debug information acquisition unit hs1-2 (step-16). The support-dedicated software hs1 then retrieves a recovery command sequence corresponding to the checked error data pattern from the debug information acquisition unit hs1-2. The support-dedicated software hs1 (command issuing unit hs1-1) sends a command to the device long processing unit us2 of the end user side system u1 through the path from hs2 through hs3, hs4, and n1 to us3 in accordance with the retrieved recovery command sequence to perform recovery (step-17). The debug log processing unit us2 executes the recovery command on the optical device ud1 and the tape device ud2 via the special communication path drt1 and the special communication path drt2, respectively, to recover the optical device ud1 and the tape device ud2.

This procedure is used to analyze the problem in the end user side device and send the recovery command, as described below.

(1) The "device status check" command, created by the command issuing unit hs1-1 of the support-dedicated software hs1, is sent to the end user side system u1 through the path from hs2 through hs3, hs4, and n1 to us3.

(2) Upon receiving the sent "device status check" command, the device interface unit us1 and the debug log processing unit us2, the firmware on the interface apparatus us4 on the end user side system u1, checks the optical device ud1 and tape device ud2 for the statuses thereof or the interface apparatus us4 for the status thereof and creates data on the result. This log information is returned to the command issuing unit hs1-1 through the path from us3 through n1, hs4, and hs3 to hs1-2 for storage.

(3) In (2), described above, the debug information acquisition unit hs1-2 of the support-dedicated software hs1 checks the log information sent by the end user side system u1 against the database thereof to determine the status of the problem and retrieve the recovery command sequence (data) corresponding to the problem.

(4) The support-dedicated software hs1 (command issuing unit hs1-1) issues a command to the end user side system u1 in accordance with the command sequence retrieved in the above described (3). The path through which the command is issued is the same as that in (1).

(5) In accordance with the input command, the debug log processing unit us2 of the end user side system u1 executes the recovery command on the optical device ud1 and the tape device ud2 via the special communication path drt1 and the special communication path drt2, respectively, to recover the optical device ud1 and the tape device ud2.

Furthermore, after the command issuing sequence in (5), described above, is finished, the "procedure of checking the end user side device for the status thereof" is executed to check the end user side system u1 for the status thereof.

Now, with reference to FIG. 6, description is given of a procedure in which the support side host PCh1 turns on and off the power supply to the devices.

Figure 6A:
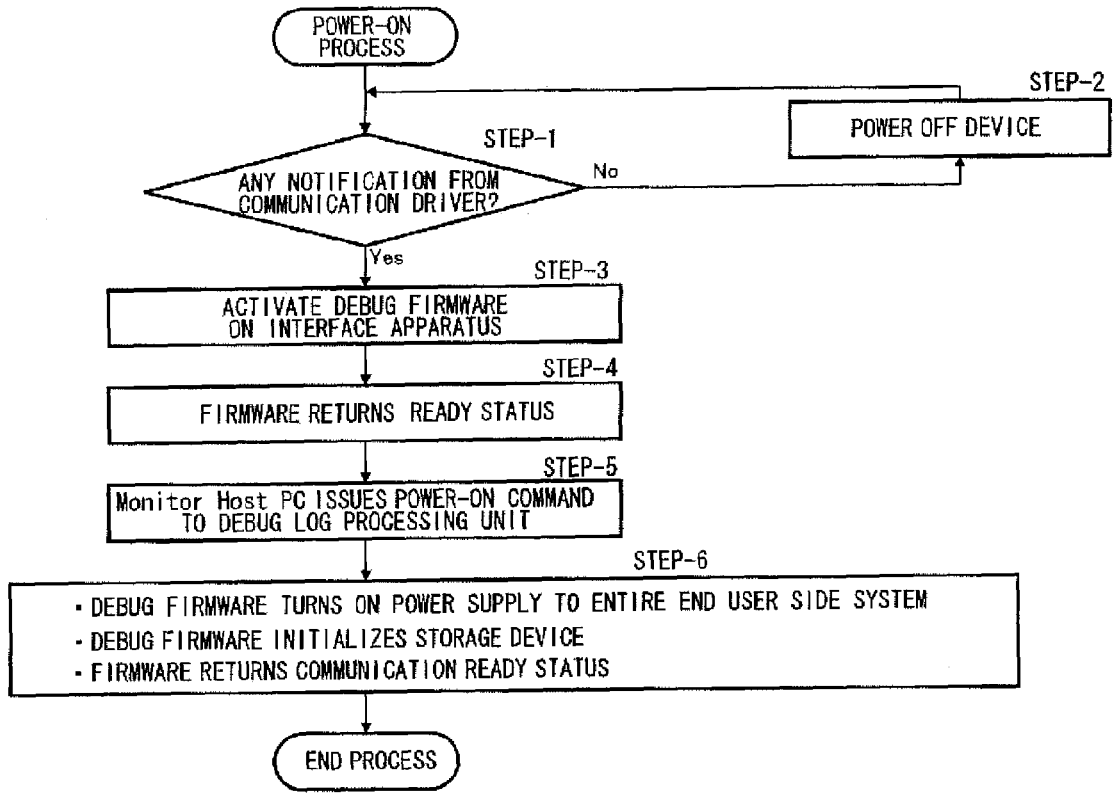
FIG. 6 is a flowchart showing a procedure in which the support side host PC in the device remote monitor/recovery system turns on and off a power supply to the monitored side system.

First, a device power-on procedure will be described with reference to FIG. 6(a). Only a network chip (not shown) in the network connection unit us3 in the interface apparatus us4 on the end user side system u1 is always powered on.

A check is made of whether or not a communication start signal has been issued by the communication driver hs3 in the support side host PCh1 (step-1). When the issuance of the communication start signal cannot be confirmed, a device power-off status is maintained (step-2). When the issuance of the communication start signal is confirmed, the network chip in the interface apparatus us4 activates the debug firmware incorporated in the interface apparatus us4 on the end user side system u1 (step-3). After the debug firmware is activated, the network connection unit us3 returns a ready status signal to the support side host PCh1 (step-4).

Upon confirming the issuance of ready status signal, the support-dedicated software hs1 (command issuing unit hs1-1) of the support side host PCh1 sends a "power-on" command created by the command issuing unit hs1-1 to the debug log processing unit us2 of the end user side system u1 through the path from hs2 through hs3, hs4, and n1 to us3 (step-5).

The debug log processing unit us2 turns on the power supply to the entire end user side system u1 to initialize the devices ud1 and ud2 and the network connection unit us3 outputs a communication ready signal to the support side host PCh1 (step-6), and the process is finished.

Figure 6B:
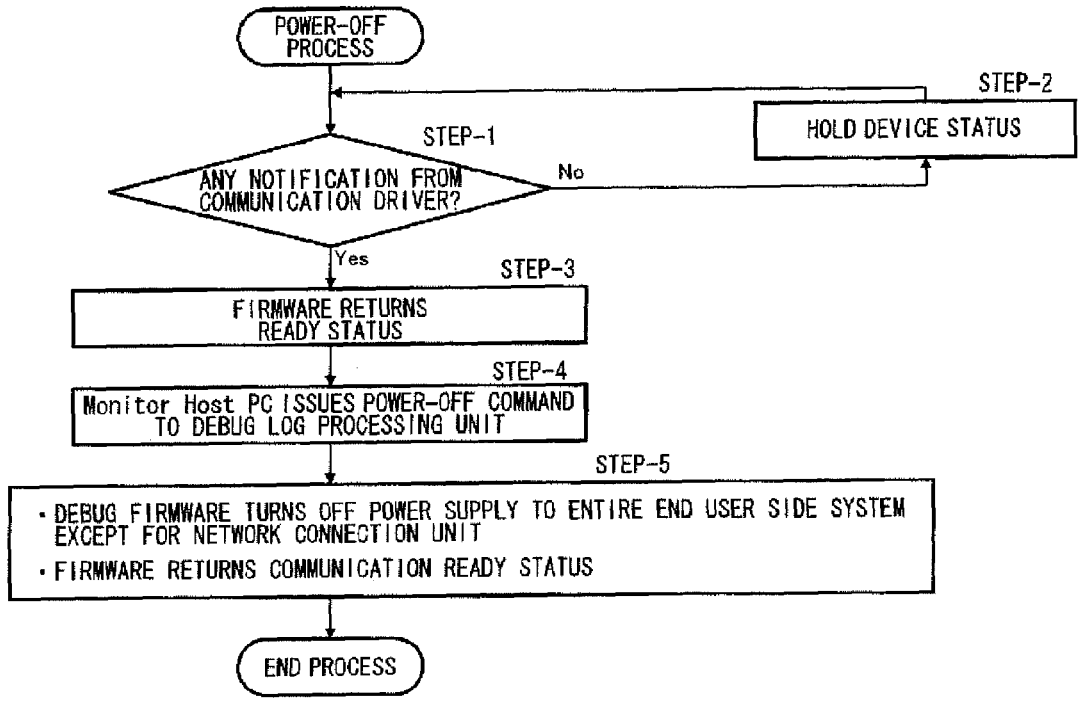

Now, a device power-off procedure will be described with reference to FIG. 6(b).

A check is made of whether or not a communication end signal has been issued by the communication driver hs3 in the support side host PCh1 (step-1). When the issuance of the communication end signal cannot be confirmed, the device power supply status is maintained (step-2). When the issuance of the communication end signal is confirmed, the network connection unit us3 returns the ready status signal to the support side host PCh1 (step-3).

In response to the ready status signal, the support-dedicated software hs1 (command issuing unit hs1-1) of the support side host PCh1 sends a "power-off" command created by the command issuing unit hs1-1 to the debug log processing unit us2 of the end user side system u1 through the path from hs2 through hs3, hs4, and n1 to us3 (step-4).

The debug log processing unit us2 turns off the power supply to the entire end user side system u1 except for the network connection unit u3 and the network connection unit us3 outputs the communication ready signal to the support side host PCh1 (step-5), and the process is finished.

Only the network chip in the interface apparatus us4 on the end user side system u1 is always powered on.

These procedures are used to perform a power-on operation and a power-off operation as described below (1) Only the network chip in the interface apparatus us4 on the end user side system u1 is always powered on. In this state, upon confirming the issuance of the communication start signal issued by the communication driver hs3 in the support side host PCh1, the network chip activates the debug firmware incorporated in the interface apparatus us4.

(2) After the debug firmware is activated, the network connection unit us3 returns the ready status to the support side host PCh1.

(3) The support-dedicated software hs1 on the support side host PCh1 sends the power-on command to the debug log processing unit us2 on the end user side system u1.

(4) The debug log processing unit us2 turns on the power supply to the entire end user side system u1 to initialize the devices ud1 and ud2.

A similar procedure is used to execute the power-off process.

As described above, the present embodiment exerts the following effects.

(1) In response to the "device status check" command, created by the command issuing unit hs1-1 of the support-dedicated software hs1, the end user side system u1 checks the optical device ud1 and tape device ud2 or the interface apparatus us4 for the status thereof and returns the log information to the command issuing unit hs1-1 of the support-dedicated software hs1 for storage. Thus, even if the support side environment is located away from the end user's environment, an operation of analyzing a problem with the device or a support operation can be directly performed via the network n1 without the need to have a support engineer visit the end user's site. Moreover, error information can be obtained with the environment maintained which existed when the problem occurred in the end user side device. This prevents the problem having occurred in the end user's environment from disappearing after the system has been sent to the support engineer or before the support engineer visits the end user's site. The support engineer can discover the problem early and take appropriate measures to solve the problem.

(2) The debug information acquisition unit hs1-2 of the support-dedicated software hs1 checks the log information (error log information) sent by the end user side system u1 against the database of the debug information acquisition unit hs1-2 to determine the status of the problem and retrieves the recovery command sequence (data) corresponding to the problem. The support-dedicated software hs1 (command issuing unit hs1-1) issues commands to the end user side system u1 in accordance with the retrieved command sequence. The debug log processing unit us2 of the end user side system u1 executes the recovery command on the optical device ud1 and the tape device ud2 via the special communication path drt1 and the special communication path drt2, respectively, to automatically recover the optical device ud1 and the tape device ud2. Thus, even if the devices ud1 and ud2 cannot communicate with the device interface unit us1 or the support side environment is located away from the end user's environment, the error in the optical device ud1 and the tape device ud2 can be corrected via the network n1 without the need to have the support engineer visit the end user's site. Furthermore, when a problem occurs, the problem can be automatically corrected at the time that the support side receives a direct call from the end user or detects that a problem has occurred in the end user's device on the basis of a warning from the monitored side system or the like.

In the present embodiment, the device to be supported and monitored is the optical device ud1 and the tape device ud2. However, the present invention is not limited to this. The device may be a hard disk device having an IDE (Integrated Drive Electronics) interface. In this case, the connection scheme is such that the device interface unit us1 transmits and receives data in accordance with the data transmission scheme for the device.

INDUSTRIAL APPLICABILITY

The device remote monitor/recovery system in accordance with the present invention is effective for allowing the support engineer to directly perform an operation of analyzing a problem with the device or a support operation even if the support side environment is located away from the end user's environment. The present invention is thus applicable to fields such as home security.

The invention claimed is:

1. A remote monitor/recovery system comprising a support side monitor host computer connected to a communication network and a monitored side system connected to the communication network, the remote monitor/recovery system operating via the communication network, wherein
the monitored side system comprises:
a device to be monitored and supported; and
an interface apparatus connected between the device and the communication network for transmitting and receiving data between the device and the monitor host computer via the communication network, and
the interface apparatus comprises:
a device interface unit for controlling a connection to the device;
a network connection unit for controlling a connection to the communication network; and
a debug log processing unit connected to the device interface unit and the network connection unit for controlling and monitoring the device via the device interface unit in response to a command sent by the monitor host computer via the network connection unit, and
a serial interface connection between the debug log processing unit of the interface apparatus and the device for enabling the debug log processing unit and the device to communicate directly with each other without using the device interface unit,
the monitor host computer comprises:
support-dedicated software for the monitored side system; and
a database for storing error data patterns for the device and device recovery command sequences corresponding to the error data patterns,
the monitor host computer is configured for, on the basis of the support-dedicated software, executing:
a first step of issuing a command reporting on a status history of the device interface unit of the interface apparatus or a command reporting on a status history of the device, to the debug log processing unit of the monitored side system via the communication network to acquire an error data pattern in the status history of the device or device interface unit from the debug log processing unit;
a second step of checking the error data pattern in the status history of the device or device interface unit acquired in the first step against error data patterns in the database; and
a third step of issuing a recovery command sequence to the database corresponding to the error data pattern checked in the second step, to the debug log processing unit of the monitored side system via the communication network, the debug log processing unit then executing the recovery command to directly recover from an error in the device having the serial interface connection with the debug log processing unit of the interface apparatus,
the monitor host computer is configured for executing, before executing the first through third steps:
a fourth step of issuing a command checking whether or not the device is connected to the interface apparatus, to the debug log processing unit of the monitored side system via the communication network to check whether or not the device is connected to the interface apparatus on the basis of a response from the debug log processing unit;
a fifth step of, upon confirming in the fourth step that the device is not connected to the interface apparatus, determining that a power supply to the device is off and issuing a command activating the power supply to the device to the debug log processing unit of the monitored side system via the communication network to turn on the power supply to the device, and
the monitor host computer for executing:
a sixth step of, upon confirming in the fourth step that the device is connected to the interface apparatus, issuing a command checking whether or not the device interface unit is in operation, to the debug log processing unit of the monitored side system via the communication network and checking the device interface unit for an operational status thereof on the basis of a response from the debug log processing unit;
a seventh step of, upon failing to confirm in the sixth step that the device interface unit is in operation, checking whether or not a network function of the device interface unit is abnormal on the basis of a response of the operational status from the debug log processing unit, wherein upon confirming in the seventh step that the network function of the device interface unit is abnormal, the monitor host computer issues the command reporting on the status history of the device interface unit in the first step.

2. The device remote monitor/recovery system according to claim 1, wherein the device is connected to the interface apparatus in accordance with an ATAPI data transmission scheme, an SCSI data transmission scheme, or an IDE data transmission scheme, and the device interface unit of the interface apparatus is for transmitting and receiving data to and from the device in accordance with the data transmission scheme for the device.

3. The device remote monitor/recovery system according to claim 1, wherein the network connection unit of the interface apparatus has an IP security function, and the data transmission between the network connection unit and the monitor host computer is executed in accordance with TCP/IP, and when transmitted, a header of a data block in a packet in accordance with TCP/IP contains the command.

* * * * *